UNITED STATES PATENT OFFICE.

ROBERT G. ELLIOTT, OF TOLEDO, OHIO.

HOT-AIR HEATING PLANT.

No. 917,756.　　　Specification of Letters Patent.　　Patented April 13, 1909.

Application filed December 4, 1908. Serial No. 465,977.

*To all whom it may concern:*

Be it known that I, ROBERT G. ELLIOTT, a citizen of the United States, and a resident of Toledo, in the county of Lucas and State of Ohio, have invented a certain new and useful Improved Hot-Air Heating Plant; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to hot-air heating-plants of the class intended more particularly for use in large buildings, such as school-houses, office buildings or the like, and has for its object not only to increase the efficiency of such plants, but to reduce the cost of operating the same to a minimum, and also to place the regulation of the temperature of the air distributed to the rooms under the more perfect control of the attendant, as will hereinafter be more fully described.

The operation, construction and arrangement of the parts of my invention are fully described in the following specification, and illustrated in the accompanying drawings, in which,—

Figure 1:
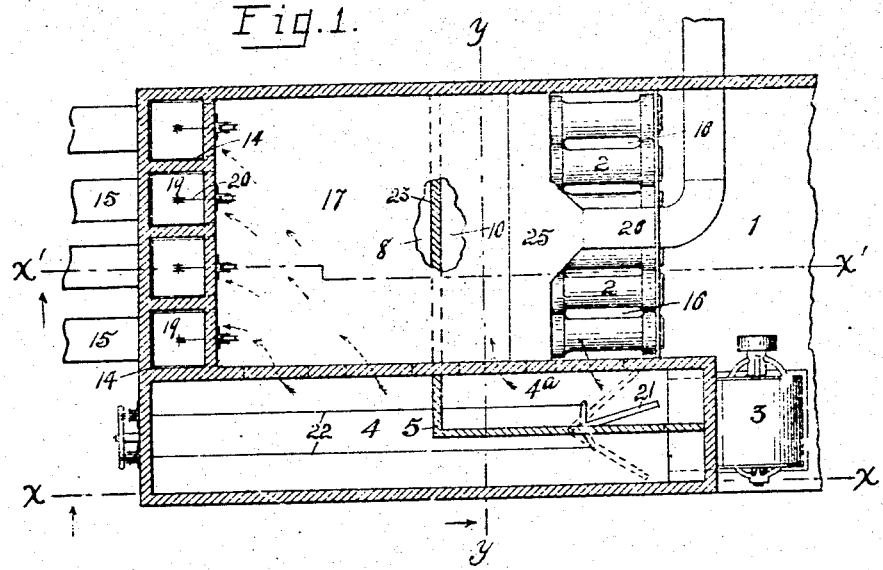
Figure 2:
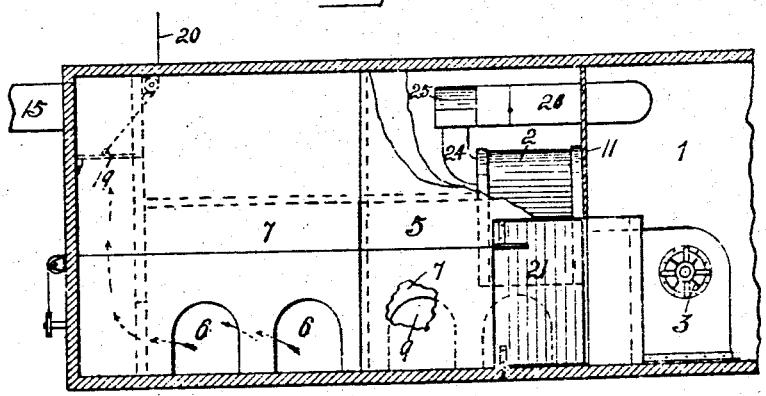
Figure 3:
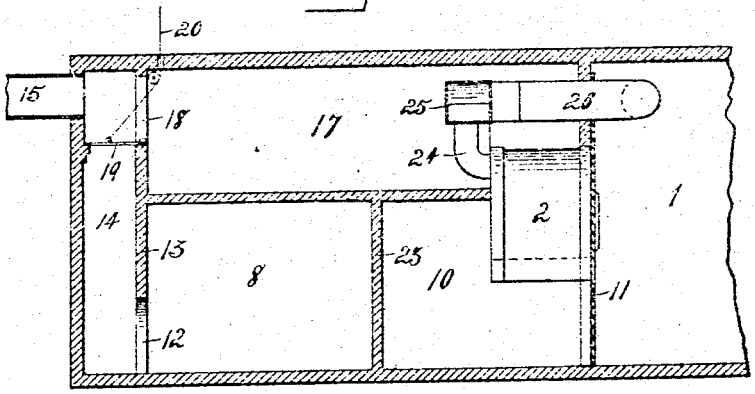
Figure 4:
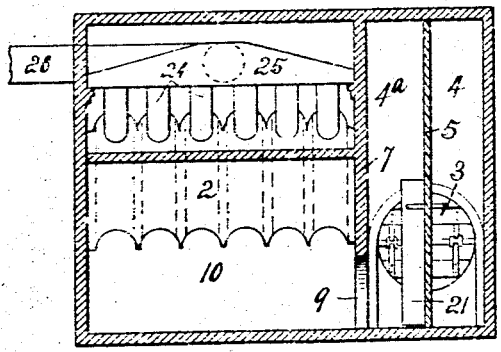

Figure 1 is a horizontal section on the line $w$ $w$ in Fig. 2, of a plant embodying the features of my invention. Fig. 2 is a vertical section on the line $x$ $x$ in Fig. 1, with portions of the dividing walls broken away. Fig. 3 is a similar section on the line $x'$ $x'$ in Fig. 1, and Fig. 4 is a vertical transverse section on the line $y$ $y$ in Fig. 1.

Referring to the drawings, 1 designates a furnace-room, in the rear of which are located a plurality of furnaces 2, while at one side thereof or at any other suitable point is located a fan or blower 3, which is intended to force air into a cold-air chamber comprising compartments 4 and $4^a$, which compartments are divided from each other by the partition 5 extending from bottom to top thereof, as shown.

The compartment 4 of the cold-air chamber communicates through openings 6 in the wall 7 thereof with a supplemental cold-air chamber 8, while the compartment $4^a$ communicates through openings 9 in the wall 7 with a chamber 10, which is located in advance of the chamber 8, and has the furnaces 2 disposed in the forward end thereof, as shown, its forward wall, which divides it from the furnace-room 1, being shown at 11.

The chamber 8 communicates through openings 12 in its rear wall 13 with exit-flues 14, each of which has a distributing-pipe 15 leading from its upper end, while the chamber 10 communicates through openings 16, provided between the furnaces 2, with the hot-air chamber 17 which is superimposed on the chambers 8 and 10, as best shown in Fig. 3. The hot-air chamber 17 communicates at its rear end through openings 18 in the wall 13 with the upper ends of the flues 14 above gravity gates 19, which gates are adapted to normally divide the flues 14 into upper and lower compartments, from the upper ones of which the distributing-pipes 15 lead. The opening of the gates 19 is controlled by cords 20, which lead to a point of vantage in the furnace room, or to any other place from which it may be desired to operate the gates.

The partition 5 which separates the cold-air compartments 4 and $4^a$, has its forward end disposed substantially mid-way of the mouth of the exit-flue from the fan, and is provided at such point with a vertical gate 21, which is shiftable by means of cords 22, to cause a greater or less amount of air to enter either of the compartments 4, $4^a$, as is apparent. The rear end of the wall 5 connects with the side-wall 7 of the cold-air chamber at substantially a point in line with the partition 23, which separates the chambers 8 and 10, as shown in Fig. 1.

24 designates smoke exit-flues for the furnaces, which communicates with a common breeching 25 having an exit-pipe 26 leading therefrom, as shown, or in any other suitable manner.

In the operation of the plant embodying my invention, air is forced under pressure by the fan 3 into the cold-air chambers 4 and $4^a$, the proper amount being caused to enter each by placing the gate 21 in the desired position for such purpose. The air which enters the chamber 4 is forced into the chamber 10 through the opening 9 in the dividing-wall 7, and, having no other exit, is caused to pass through the openings 16 between the furnaces 2 and into the hot-air chamber 17, from which it finds an exit through the openings 18 and upper ends of the flues 14 into the distributing-pipes 15. As the air which enters the hot-air chamber 17 becomes very highly heated in its passage between the furnaces 2, it is necessary to provide some means for regulating the temperature of the air as it enters the pipes 15. This is accomplished by the air which enters the compartment 4 of the cold-air chamber being forced into the chamber 8 through the openings 6 and thence passing into the flues 14 through the openings 12 therein and being permitted to commingle with the hot-air which enters the upper ends of the compartments 14 from the hot-air chamber 17 by an opening of the gates 19 to the desired degree. It is estimated that by passing three-tenths of the air output of the fan between the furnaces it is heated sufficiently to heat the remaining seven-tenths of cold-air which passes into the chamber 4 to a suitable temperature to heat the rooms.

In the plants of the class described, which have heretofore been used, the wall 5 which divides the cold-air chamber into two compartments has been eliminated, and communication provided between the chambers 8 and 10 through openings in the wall 23. This arrangement was found to be objectionable for the reason that if the gates 19 were partially opened, the air-currents, instead of passing from the chambers 8 and 10 between the furnaces and into the hot-air chamber 17 from whence it had an exit through the pipes 15, its course would be reversed and the air in the chamber 17 would pass down between the furnaces 2 and into the chambers 10 and 8, thus heating the cold air supply so that the air which passed up through the flues 14 to moderate the temperature of the air entering the pipes 15 was heated, thus very considerably lessening the efficiency of the plant. A further objection to this construction was that the large volume of cold air passing between the furnaces 2 would tend to cool them so that more fire would be required to heat the air to the desired temperature. With applicant's arrangement, which consists in dividing the cold-air chamber into two compartments by the wall 5, and closing the communication between the chambers 8 and 10, a portion only of the cold air admitted to the cold-air chamber is forced past the furnaces thereby heating such portion to a considerably higher temperature than the entire volume of air which is forced into the cold-air chamber by the fan could be heated if directed through the spaces between the furnaces, and also maintaining at all times a cold-air supply for commingling with the highly heated air, whereby to moderate the temperature thereof to the desired extent, as no matter how much the gates are opened, the direction of flow of the heated air-currents cannot be reversed.

It is found by actual practice that by permitting only a portion of the cold air supply to pass up between the boilers the feed consumption is reduced very nearly one half over that of the old form. This is accounted for by the fact that a small volume of cold air would not have the same cooling effect on the boilers as would a large volume of cold air, thus requiring less fuel to maintain the boilers at their full or desired heating efficiency. It has also been found by the use of this construction that a room or rooms after having their windows opened for airing can be heated much more quickly than with the old construction due to the admitting of the highly heated air thereto; and it is also possible to more quickly cool a room by admitting cold air only thereto, as it is found with the old construction that a full opening of the regulating gates will cause a reversal of the flow of the air currents so that the heated air will flow back from the hot air chamber to the cold air chambers, and thence up through the flues 14 and to the room, thus forcing heated instead of cool air into the room.

I desire it to be understood that my invention is not limited to any specified form, arrangement or size of the chambers or other parts thereof, except in so far as such limitations are specified in the claims.

Having thus described my invention, what I claim as new and desire to secure by Letters Patent, is,—

1. In a heating-plant of the class described, a cold-air chamber, a partition in said chamber dividing it into two non-communicating compartments, means for forcing air into said compartments, a plurality of flues communicating with one of said cold-air compartments, gates dividing said flues into upper and lower compartments, distributing-pipes leading from the upper of said flue compartments, and a plurality of furnaces having spaces therebetween, said spaces being in communication below the furnaces with the cold-air compartment not in communication with said flues and in communication above the furnaces with the upper compartments of said flues, substantially as described.

2. In a heating-plant of the class described, a cold-air chamber, a wall dividing said chamber into two non-communicating compartments, means for forcing air into said compartments, two non-communicating chambers, one having communication with one of said cold-air compartments and the other having communication with the other of said cold-air compartments, exit-flues leading from one of said chambers, gates dividing said flues into upper and lower compartments, furnaces associated with the other of said chambers and having passages therebetween which communicate at one end with such chamber and at their other end with the upper of said flue compartments, and distributing-pipes leading from the upper of said flue compartments.

3. In a heating-plant of the class described, a cold-air chamber, a wall dividing said chamber into two non-communicating compartments, a plurality of walls forming chambers, one of which communicates with one of said cold-air compartments and the other with the other of said cold-air compartments, and a hot-air chamber which superimposes the chambers in communication with the cold-air compartments, exit-flues leading from one of the chambers in communication with the cold-air compartments, gates dividing said flues into upper and lower compartments, the upper of which communicate with the hot-air chamber, furnaces located in the chamber which communicates with the cold air compartment not in communication with said flues and having passages therebetween in communication at one end with the chamber in which such furnaces are located and at their other end with the hot-air chamber, and distributing-pipes leading from the upper of said flue compartments.

4. In a heating-plant of the class described, a plurality of walls forming the non-communicating cold-air chambers 4 and 4ª, the non-communicating chambers 8 and 10, the former of which has communication with the cold-air chamber 4, while the latter has communication with the cold-air chamber 4ª and the superimposed hot-air chamber 17, exit-flues leading from the chamber 8, gates dividing said flues into upper and lower compartments, the upper of which communicate with the cold-air chamber 17, distributing-pipes leading from the upper compartments of said flues, and furnaces associated with the chambers 10 and 17 and having passages therebetween opening communication between said two chambers.

5. In a heating-plant of the class described, a plurality of walls dividing the plant into two non-communicating cold-air compartments, a chamber in communication with one of said cold-air compartments and a hot-air chamber in communication with said chamber, exit-flues in communication with the cold-air compartment which is not in communication with said first mentioned chamber, gates dividing said flues into upper and lower compartments, the upper of which communicate with said hot-air chamber, furnaces associated with said hot-air and other chamber and having passages therebetween which open communication between said chambers, and distributing-pipes leading from the upper of said flue compartments.

6. In a heating-plant of the class described, a plurality of walls dividing said plant into two non-communicating cold-air compartments, a chamber 10 and a hot-air chamber 17, furnaces associated with the chambers 10 and 17 and having passages therebetween opening communication between such chambers, the chamber 10 being in communication with one of said cold-air compartments, exit-flues in communication with the other of said cold-air compartments, gates dividing said exit-flues into upper and lower compartments, the upper of which communicate with the hot-air chamber 17, distribution-pipes leading from the upper compartments of said flues, means for forcing air into said cold-air compartments, and means for varying the supply of air admitted to either of said compartments, substantially as described.

7. In a plant of the class described, a plurality of flues, gates dividing said flues into upper and lower compartments, distributing-pipes leading from said upper compartments, a plurality of walls providing communication between one of said cold-air compartments and the lower compartments of said flues and between the other of said cold-air compartments and the upper of said flue compartments, and heating means disposed to heat the air passing between said last mentioned cold-air compartment and the upper compartment of said flues.

8. In a plant of the class described, a plurality of flues, gates dividing said flues into upper and lower compartments, distributing-pipes leading from said upper compartments, a plurality of walls providing communication between one of said cold-air compartments and the lower compartments of said flues and between the other of said cold-air compartments and the upper of said flue compartments, heating means disposed to heat the air passing between said last mentioned cold-air compartment and the upper compartment of said flues, and means movable to vary the supply of air admitted to either of said cold-air compartments.

9. In a heating-plant of the class described, a plurality of walls dividing the plant into two non-communicating cold-air compartments, a chamber in communication with one of said cold-air compartments, and a hot-air chamber in communication with said chamber, an exit-flue in communication with the other of said cold-air compartments, gates dividing said flue into upper and lower compartments, the upper of which communicates with said hot-air chamber, hot-air distributing means leading from the upper of said flue compartments, and heating means associated with the hot-air chamber and said other chamber for heating the air passing through said chambers, substantially as described.

In testimony whereof I have hereunto signed my name to this specification in the presence of two subscribing witnesses.

ROBERT G. ELLIOTT.

Witnesses:
C. W. OWEN,
CORNELL SCHREIBER.